US008684268B2

(12) United States Patent
Pas

(10) Patent No.: US 8,684,268 B2
(45) Date of Patent: *Apr. 1, 2014

(54) PRODUCT DISPLAY SYSTEM, PROFILE ASSEMBLY FOR A PRODUCT DISPLAY SYSTEM, AND METHOD FOR ILLUMINATING A PRODUCT

(75) Inventor: Ireneus Johannes Theodorus Maria Pas, AG Rozendaal (NL)

(73) Assignee: Hussmann Corporation, Bridgeton, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/454,365

(22) Filed: Apr. 24, 2012

(65) Prior Publication Data

US 2012/0286698 A1 Nov. 15, 2012

Related U.S. Application Data

(63) Continuation-in-part of application No. 12/374,493, filed as application No. PCT/NL2007/000187 on Jul. 20, 2007, now Pat. No. 8,164,274.

(30) Foreign Application Priority Data

Jul. 21, 2006 (NL) ..................................... 1032223

(51) Int. Cl.
*G06K 7/10* (2006.01)
*G06K 7/00* (2006.01)

(52) U.S. Cl.
USPC ....... 235/455; 235/435; 235/436; 235/462.01

(58) Field of Classification Search
USPC .............. 315/291; 235/435, 436, 455, 462.01
See application file for complete search history.

(56) References Cited

U.S. PATENT DOCUMENTS

| | | | | |
|---|---|---|---|---|
| 8,057,054 | B2 * | 11/2011 | Hudis | 362/92 |
| 8,322,873 | B2 * | 12/2012 | Glovatsky et al. | 362/92 |
| 2003/0015945 | A1 | 1/2003 | Vandenbussche | |
| 2003/0072147 | A1 * | 4/2003 | Pashley et al. | 362/92 |
| 2005/0265019 | A1 * | 12/2005 | Sommers et al. | 362/217 |
| 2007/0108283 | A1 | 5/2007 | Thuries | |

FOREIGN PATENT DOCUMENTS

| | | | |
|---|---|---|---|
| DE | 202004000004 | U1 | 6/2004 |
| EP | 1183964 | A1 | 3/2002 |
| WO | 2007016515 | A1 | 2/2007 |

OTHER PUBLICATIONS

NL Search Report for NL 1032223.
PCT Search Report for International Application No. PCT/NL2007/000187.
PCT Written Opinion for International Application No. PCT/NL2007/000187.
PCT International Preliminary Report on Patentability for International Application No. PCT/NL2007/000187.

* cited by examiner

*Primary Examiner* — Thienvu Tran
(74) *Attorney, Agent, or Firm* — Michael Best & Friedrich LLP

(57) ABSTRACT

A product display system has a product carrier and a lighting device including a plurality of light sources, each having two or more LEDs of different light color, and a control device. The control device can control the various light sources, and even the various LEDs in the light sources, in order, in this way, to achieve a different luminosity and/or light color per light source. The control device reads an information carrier having information associated with the product, and adjusts a light source which illuminates a place of the product carrier designed for the product on the basis of information read from the information carrier.

34 Claims, 2 Drawing Sheets

PRODUCT DISPLAY SYSTEM, PROFILE ASSEMBLY FOR A PRODUCT DISPLAY SYSTEM, AND METHOD FOR ILLUMINATING A PRODUCT

CROSS-REFERENCE TO RELATED APPLICATIONS

This application is a Continuation-In-Part of U.S. application Ser. No. 12/374,493, filed Jan. 21, 2009, which is the U.S. National Stage of International PCT Application No. PCT/NL2007/000187, filed Jul. 20, 2007, which claims the benefit of Netherlands Application No. NL 1032223, filed Jul. 21, 2006, the contents of all of which are incorporated by reference herein.

FIELD OF THE INVENTION

The present invention relates to a product display system. The invention further relates to a profile assembly for a product display system. The invention also relates to a method for illuminating a product.

BACKGROUND OF THE INVENTION

Many shops where products are displayed on shelves are provided with lighting systems for illuminating the products, for example because daylight offers insufficient opportunities. This is obviously very much the case during winter time. Known product lighting systems usually comprise incandescent bulbs, halogen incandescent bulbs or fluorescent tubes.

A drawback of the known product display systems is that the light sources used can often not be used in a sufficiently flexible way. Thus, fluorescent tubes which are often used because of their efficiency have a relatively low luminosity and, in addition, they have a more or less standardized light yield per unit length. The much more compact incandescent bulbs have a low efficiency and, at the same light yield, therefore emit a lot of heat which is undesirable with many products. In addition, they are often used in spotlights which are at some distance from the product (carrier), such as on the ceiling.

SUMMARY OF THE INVENTION

It is an object of the present invention to provide a flexible product display system, in which the abovementioned drawbacks are at least partly eliminated.

In an embodiment, the invention provides a product display system, comprising a product carrier and a lighting device. The product carrier may comprise at least one shelf for products. The lighting device comprises a control device and at least two light sources adjustable by the control device, each light source comprising at least two LEDs of different colour. The control device is adapted to read an information carrier containing information relevant for lighting the product, and to adjust a light source in a predetermined manner on the basis of information which is read from the information carrier, the light source being adapted to illuminate a product carried by the product carrier. Such a product display system not only has the basic advantages of LEDs, such as high light efficiency, long life and compactness of the light source(s), and a minimum of, or absence of infrared and ultraviolet radiation promoting deterioration or discolouring of food products, but can also, partly as a result thereof, be adjusted in an optimum manner to the products to be displayed without the light sources having to be changed. In addition, lighting provided on the shelf has the advantage that the light used cannot be obscured by the body of a customer, as may occur, for example, in the case of spotlighting using incandescent bulbs.

In another embodiment, the invention provides a method for illuminating a product, the method comprising: providing a product carrier; providing at least two controllably adjustable light sources adapted to illuminate the product carried by the product carrier, each light source comprising at least two LEDs of different colour; providing an information carrier containing information relevant for lighting the product; reading the information carrier; and adjusting at least one of the light sources in a predetermined manner on the basis of information read from the information carrier. The light source may be adapted to illuminate a place on a shelf designed for the product.

The above and other advantages are worked out in more detail in the claims and will be described below, and in the description of the Figures in more detail with reference to exemplary embodiments.

It is noted here that a separate light source carrier with at least two adjustable light sources may be provided for each shelf, or one light source carrier may be provided for two or more or even for all shelves together. An example of a light source carrier is a profile assembly as described in more detail below. A place designed for a product may be illuminated by more than one light source, in which one of the light sources may illuminate the product at the front side and/or the lower side, and another one of the light sources may illuminate the product at a front side and/or a top side. In addition, the light source carrier may form an integral part of a product carrier by a shelf simultaneously serving as light source carrier for a shelf located underneath.

In a particular embodiment, the lighting device comprises at least two light sources, at least one of which shines light upwards and at least one of which shines light downwards. This offers the possibility of arranging several, and in particular two, light sources in one unit, thus resulting in a more compact unit, that is to say lighting device. It should be noted that the two or more light sources could also be combined, provided that the light which actually is shone upwards and downwards can be adjusted independently of one another, for example by means of independent filters or the like. An important application of this embodiment is a display device having several shelves one above the other, in which the lighting devices can then be fitted at intermediate shelves.

In a particular embodiment, the lighting device is arranged at a predetermined distance from the shelf. The lighting device, for example, comprises an arm or the like by which it is connected to the shelf in such a manner that the lighting device is in particular some distance in front of the shelf. This ensures that the lighting device will be at a sufficient distance from the products, and this in particular prevents the situation where there remains only a kind of grazing light illuminating the (front) products. It is advantageous, particularly if the shelves are arranged in a staggered manner from top to bottom or, for example, become wider towards the bottom, to illuminate the products not only from above, as this may only result in undesirable grazing light or even worse illumination. One particular way of fitting the lighting device at a predetermined distance from the shelf is to combine it with, for example, a price label or product information holder. These are often placed at some distance from the shelves, which results in a favourable position with a view to lighting properties. Advantageously, the shelf comprises a transparent product stop. In this case, a transparent product stop is an at least partially light-transmitting boundary of the shelf, behind which the products are placed. This may, for example, comprise a plastic shock-absorbing edge which prevents products on an obliquely arranged shelf from sliding off the latter or, for example, also a spiral or the like in which products are arranged in such a manner that they can be displaced, such as in vending machines.

In a particular embodiment, the colour of at least one light source can be adjusted. This offers significant advantages regarding the display of products. The principle of selecting the light colour based on the product is known per se from displaying meat, where the red colour of meat, which is attractive to the customer, is amplified by increasing the red component of the lighting. However, due to, amongst others, the fact that the meat requires cooling and thus little heat generation, this takes place in the prior art by means of fluorescent tubes with modified luminophores (phosphors). Due to its length, this is a very inflexible light source, which, in addition, cannot be adjusted with regard to colour.

Now, particularly the adjustability of the colour is a great advantage for many more products, since other products can then also be shown to their advantage in the appropriate light by adjusting the colour of the lighting provided for said product to the colour of the product and/or the packaging thereof. For example, the lighting efficiency can be increased by exclusively or mainly using light colours which are reflected by the product. Thus, for example, tomato products can be lit well by using more or less red light sources, many vegetables by using green light sources, etcetera. Obviously, part of the remaining spectrum will also be mixed in, in order to achieve a more or less natural lighting of the product and in particular of the immediate surroundings thereof, but it will be clear that a product can be presented in an eye-catching manner by adjusting the colour of the lighting. An additional advantage of the system according to the invention is the fact that the LED light sources, due to their in many cases very small dimensions, are very useful for giving each product its own light colour, if they are side by side. This is particularly advantageous in supermarkets, since a great many products are being presented, often in varying positions on the shelves, and where there are often and in addition special offers, which require additional dedicated lighting.

In the system according to the invention, the light sources comprise LEDs of different colours. Preferably, a light source comprises at least three different colours, according to the RGB system or the like. Of course, it is possible to use more colours, such as with the four-coloured RGBA system, which includes amber. Additionally, it may be advantageous to incorporate one or more so-called white light LEDs. Light sources which are designed in the way as described above are capable of producing virtually any desired colour and thus of intensifying the latter in the product lighting.

In a particular embodiment, the colour can be changed over time in at least one light source. This means more than just being adjustable, i.e. that the (light) colour varies over time without the involvement of an operator. This may, for example, refer to a periodically changing colour. The period of colour change can then, for example, be adjusted to the maximum human attention span. The underlying idea is that changes usually attract more attention than static situations.

In an advantageous embodiment, the luminosity of at least one light source can be adjusted. This offers the advantage that a product can also be given prominence or quite literally be put in the spotlight by increasing the lighting intensity of the light source(s) illuminating the product compared to the neighbouring ones. Again, the compactness of LED light sources offers great advantages in this case, as the products in supermarkets are often relatively small and often many different ones are arranged next to one another, where one product may, and a product located adjacent to it may not be illuminated in a distinguishing way.

In a particular embodiment, the luminosity can be varied over time in at least one light source, in particular without the involvement of an operator. The change in luminosity may be take place at regular or irregular intervals. Again, the fact that a change in luminosity attracts even more attention than a non-changing luminosity pattern across the different products applies.

In an embodiment, the control device comprises an information input device which is designed for inputting and processing product-related information with regard to an adjustment of one or more light sources. Using such a control device, a system is obtained in a simple and efficient way which can provide the desired lighting for one or more products. The control device reads information for adjusting the light sources, or receives it in a different manner.

In particular, the information input device comprises a barcode reader, infrared reader, chip reader or keyboard. A barcode reader, infrared reader or chip reader can, for example, be coupled to the control device at the location of the product carrier with products. An infrared reader in this case comprises a reading device for infrared signals, such as for example an infrared remote control. This and other reading devices may, for example, be handheld reading devices with which an operator can go along the products, shelves, display devices or even shops. The information can then be read out at the product location, since many products are nowadays already provided with a barcode, infrared diode and/or identification chip, such as an RF identification chip. If the barcode, infrared diode and/or the chip then contains or is able to transmit information relevant to lighting, such as colour or colours of the product, and the dimensions, the control device can adjust the lighting of one or more light sources thereto. The relevant information may, incidentally, also be separated into product identification information on the product itself and an associated file containing lighting information relevant to lighting which can be retrieved by or via the control device. Other information input devices are not excluded, as the only thing that matters is that information relevant to lighting is made available to the control device.

Alternatively or in addition thereto, information can be input by means of a keyboard, effectively by means of a computer, optionally supported by an information storage medium, such as a CD (Compact Disc), DVD (Digital Versatile Disc), etcetera. Thus, an operator can select an illumination, for example in order to light a product in a special way, for a promotion, etcetera.

In addition, it may be advantageous to design the information input device as a two-way information input device which makes communication possible between, for example, the information input device and a product. This allows the lighting to be adjusted as follows, for example. An operator sends a call signal to a lighting device which thereupon identifies itself as a meat cooling shelf, for example, and, for example, starts to flash. The operator can then set the desired light setting and select another lighting device.

Advantageously, the controls of two or more light sources which illuminate the same spot, in particular a light source which is directed downwards and a light source which is situated on a shelf underneath the latter and is directed upwards, are coupled to one another.

In an embodiment, the lighting settings of the light sources which illuminate a shelf are identical. This is a simple design which allows for quick adjustment, but which does not make full use of the possibilities offered by the invention.

In an embodiment, at least one light source can be displaced with respect to the product carrier. Preferably, several light sources can thus be displaced. In this case, it is simple to adapt the product display system to the dimensions of a product or to the number of units of product next to one another. This is relevant, in particular, for shops where the product range or the arrangement thereof changes frequently, as is the case with supermarkets, for example.

In an advantageous embodiment, the light sources are arranged on a product carrier at a predetermined regular distance apart. In this case, the distance is preferably chosen in such a manner that it is at most equal to the narrowest "facing". In this context, a facing is that side of the product which faces the shoppers. In this manner, any product can be lit in the desired manner, depending on the width, by one or more, preferably by two or more light sources. It is also possible to achieve an overall equal lighting intensity, if desired, for example by adjusting all lighting sources to the same setting. Due to the regular spacing, the lighting is even. If the spacing were irregular, for example with displaceable light sources and varying product widths, even lighting could only be achieved through the involvement of an operator who places the lighting sources at regular distances apart by sliding.

In principle, the power of the LEDs in the light sources is not limited in a particular way and will be chosen based on the dimensions of the products to be lit, the desired lighting intensity etcetera. Advantageously, the power of the LEDs is at most 1 W. Such LEDs offer a very low power consumption while the light yield is still sufficient to light a single product, in the shape of a row of units of product placed one behind the other. In fact, very bright LEDs, such as Ultrabrite LEDs, may even have disadvantages in this case, as the light they emit is, for example, too bright, the beam is too wide, etc. Of course, it is possible to think of circumstances where they would indeed offer advantages, such as in shops having shelves with many large products.

Advantageously, the power of the lighting device per carrier is at most 10 W/m. Thus, a very expedient lighting device, which still has all the advantageous properties of the invention, can be provided. In this case, it is again true that it is possible to provide more W/m in lighting power, although this is not necessary.

In a particular embodiment, the product carrier comprises a display cabinet having several shelves positioned one above the other. Such a product carrier is frequently used, as it allows a large number of products to be displayed on a limited floor area. Particularly with such multi-shelf cabinets, it is very desirable that every product is lit in a sophisticated manner, in particular in the case of cabinets where the vertical distance between the shelves is small compared to their depth. In an application of a plurality of shelves situated one above the other, by way of example all shelves may be substantially equally deep, the shelves situated higher up can be less deep than the shelves situated lower, or the shelves situated high and low can be deeper than the shelves situated in between.

In an embodiment, the display cabinet comprises a closed cabinet, in particular a refrigerator. When the cabinet is closed, efficient lighting from the outside is not readily possible and the advantages of the invention are particularly useful. In addition, due to the high efficiency of LEDs, the heat generation is very limited, which is advantageous, particularly, although not exclusively, in the case of refrigerators.

In a particular embodiment of the system according to the invention, the latter comprises several display cabinets arranged in at least one row. This embodiment is particularly advantageous for use in shops having large numbers of products.

In principle, each light source may be provided with its own control device. It is also possible for a single control device to be connected to and adapted for controlling several light sources, for example the light sources of a shelf, of a cabinet, of a row of cabinets or of a complete shop. Obviously, other combinations are possible. It is also possible to provide several control devices which, in turn, can communicate with a central control system.

The invention also provides a shop, comprising a product display system according to the invention, as well as several products displayed in the product display system. Such a shop is characterized by a sophisticated, energy-efficient and very flexible lighting system, having the advantages which have already been described above.

In particular, at least one of the group comprising the products, the product carrier and the control device is provided with an information carrier containing information relevant for lighting the product. More particularly, the product or a product information carrier on the product carrier may be provided with a barcode comprising lighting information or with an infrared diode or chip comprising lighting information, as has already been described above. Such information can then be read out, for example when arranging or filling the shelves, during which procedure the lighting is adjusted. The product may also only be provided with product identification means, for example in the form of the above-mentioned barcode or chip, with the control device, based on the product identification means, searching for the desired lighting information in a database and subsequently adjusting the lighting. In addition, it may be possible to connect the control unit to an information storage unit containing lighting information related to a product. This embodiment serves, for example, to carry out special lighting tasks, such as for promotions, sales, new products, etcetera.

In an embodiment, the product display system further comprises a display device adjustable by the control device, the display device being adapted to display, in correspondence with the adjustment of the light source, product information on the basis of information read from the information carrier. Accordingly, at a location of a product carrier designed for a product, at least one of the illumination of the product by the light source, and the corresponding displayed information about the product may be adjusted to be in line with each other. As an example, a special offer may be displayed by the display device, while at the same time the illumination of the product is adjusted to attract the attention of potential customers to approach the product carrier and to read the display.

In an embodiment, the light source and the display device are mounted on a profile assembly, i.e. an assembly comprising at least one profile or profiled structure to carry one or more light sources and one or more corresponding display devices, for one or more product locations on or in a product carrier.

In an embodiment, the profile assembly comprises at least one light source adapted to illuminate a product carried by a product carrier, and at least one adjustable display device comprising a controllable display screen for displaying still or moving images related to the product. The display screen may be a liquid crystal display (LCD) screen. In some embodiments, the display screen is an e-paper screen, which is a bistable LCD display screen requiring basically zero power once a desired image is displayed.

The profile assembly may be configured to be coupled to a power supply to power at least one of the light source and the display device. For this purpose, part of the profile assembly may be electrically conducting to form at least one conductive path from the power supply to the light source(s) and/or the display device(s). In some embodiments, alternatively or additionally, conductors may be included in the profile assembly to electrically connect a power supply to the light source(s) and/or the display device(s). In some embodiments, the power supply may be included in the profile assembly. In some embodiments, the power supply may not form part of the profile assembly, provision being made to electrically couple the power supply to the profile assembly, e.g. by one or more connectors mounted on the profile assembly.

In an embodiment, the at least one light source and the at least one display device are configured to be coupled to a control device. The control device may be adapted to adjust the light source(s) in a predetermined manner on the basis of lighting information, and/or the control device may be adapted to adjust the display device in a predetermined manner on the basis of display information, i.e. information to control the information displayed on the display screen. For this purpose, part of the profile assembly may be electrically conducting to form at least one conductive path from the control device to the light source(s) and/or the display device(s). In some embodiments, alternatively or additionally, conductors may be included in the profile assembly to electrically connect the control device to the light source(s) and/or the display device(s). In some embodiments, a radio frequency or infrared light wireless transmission path may be provided to couple the control device to the light source(s) and/or the display device(s). The electrically conducting path or the wireless transmission path serves to communicate control signals between the control device and the light source(s) and/or the display device(s). In some embodiments, the control device may be included in the profile assembly. In some embodiments, the control device may not form part of the profile assembly, provision being made to couple the control device to the profile assembly, e.g. by one or more connectors mounted on the profile assembly, or by a wireless transmission path, wherein the control device comprises a communication device configured to communicate through the wireless transmission path. The wireless transmission may be based on radio frequency (RF) or infrared communication.

In an embodiment, at least one display device comprises a communication device configured to receive display information and lighting information. The communication device may be a radio frequency (RF) or an infrared receiver or first transceiver configured to receive RF or infrared signals, respectively, from a RF or an infrared transmitter or second transceiver. Such transmitter or second transceiver may be a handheld device or a stationary device in communication with one or a plurality of receivers or first transceivers. The communication device is configured to be coupled to the control device for transmitting the lighting information to the control device, which may then adjust the light source(s) in a predetermined manner on the basis of the lighting information. In some embodiments, the control device forms part of the display device. In correspondence with the adjustment of the light source(s), display device(s) associated with the same location of a product on a product carrier as the light source(s) may be adjusted.

In an embodiment, the profile assembly comprises a channel for accommodating the light source(s). The channel is formed by a profile and a hood which is at least partially transparent to allow the light from the light source(s) to pass to a product location designed to be illuminated by the light source(s).

In an embodiment, the profile assembly is configured to be connected to a profiled edge part of a product carrier, such as a shelf. Using elongated profiled structures with appropriate cross-sectional shapes allows for an easy assembly by sliding one structure relative to another.

It should be noted here that all embodiments mentioned above can in principle be combined. Thus, for example, also a shop is provided with a row of refrigerators having shelves on which several displaceable light sources are provided, which can be varied with regard to colour and luminosity.

BRIEF DESCRIPTION OF THE DRAWINGS

The invention will be explained below with reference to the drawing, in which.

DETAILED DESCRIPTION OF PREFERRED EMBODIMENTS

Figure 1:
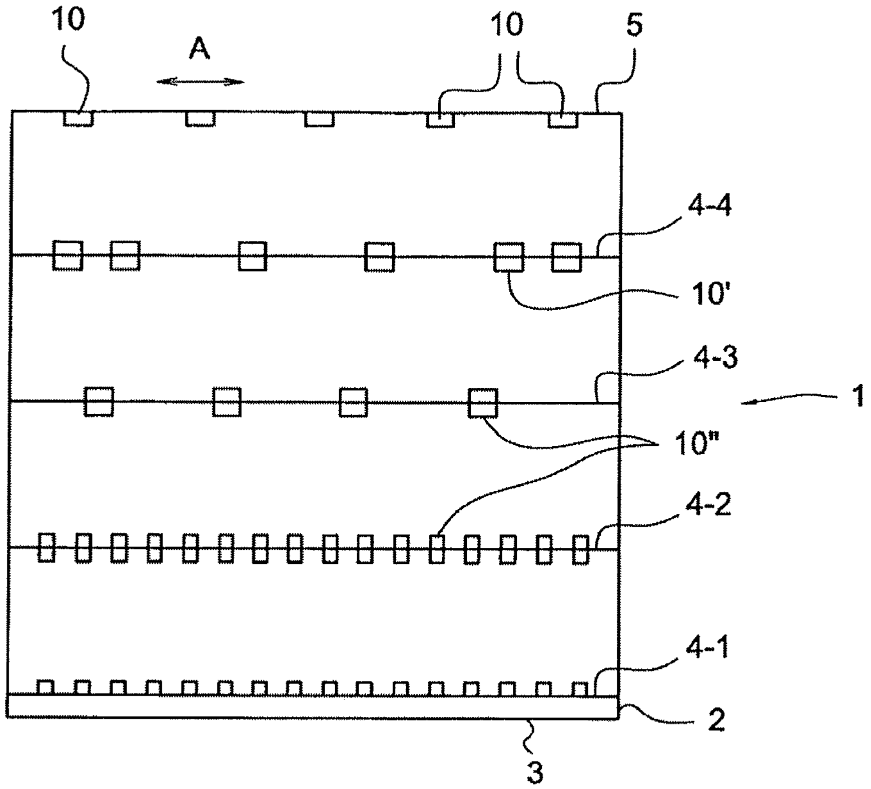
FIG. 1 shows a diagrammatic front view of a product display system according to the invention.

FIG. 1 shows a diagrammatic front view of a product display system 1 according to the invention. Reference numeral 2 denotes a display cabinet having a bottom 3, four shelves 4-1 to 4-4 above that and a top 5. Reference numerals 10, 10', 10" denote lighting devices.

The lighting devices 10 comprise single light sources which only shine light downwards. By contrast, the lighting devices 10' and 10" each comprise two light sources, one of which shines downwards and one of which shines upwards. Note that shelf 4-1 again comprises single lighting devices which only shine upwards.

The light sources directed at the shelf 4-1 and attached to shelf 4-2 are at a regular distance from one another. The distance is chosen such that products of every possible dimension can be well lit. This means that the distance is, in principle, at most equal to the narrowest product areas, for example herbs sachets in a supermarket. In the case of wider products, two or more light sources 10 can then provide lighting.

There are far fewer light sources 10" on shelf 4-3 and they are positioned at a correspondingly greater distance. These may, in this case, for example, be LEDs with a wider emission angle, if desired also with a correspondingly greater light yield. Such an arrangement may be expedient if relatively large products are being displayed, such as packs of kitchen paper or the like.

Light sources 10 are arranged at irregular intervals on shelf 4-4. In this case, the arrangement may have been adapted to products of different sizes or depending on the amount of shelf space they take up.

On top 5, light sources are shown which are displaceable in the directions of double arrow A. Thus, the distribution of light sources on the shelf can be adjusted and it is possible to obtain the arrangement of, for example, shelf 4-3 or 4-4.

Here it is noted here that it is preferable if all shelves 4-1-4-4, and top 5 are provided with the same number of lighting sources at a regular distance apart.

The lighting devices 10, 10', 10" each may comprise two or more LEDs of different light colour, the luminosity of which can be controlled independently. The result thereof is that the light colour can be adjusted and, in the case where the luminosity of each LED is changed by an equal amount, the luminosity can be changed overall while the light colour remains the same. A changing light colour is, for example, advantageous in order to provide accentuated lighting for a product. For example, by illuminating a product in yellow packaging with light which has a very high proportion of the same yellow colour, it will stand out more against the surroundings of the product. Effectively, the effect is similar to that of fluorescent colours. An adjusted light colour may also affect the attractiveness of the product presentation, as is the case with the known red-coloured light for meat products. In addition, it is also possible to adjust the luminosity per product and achieve the same result.

Figure 2:
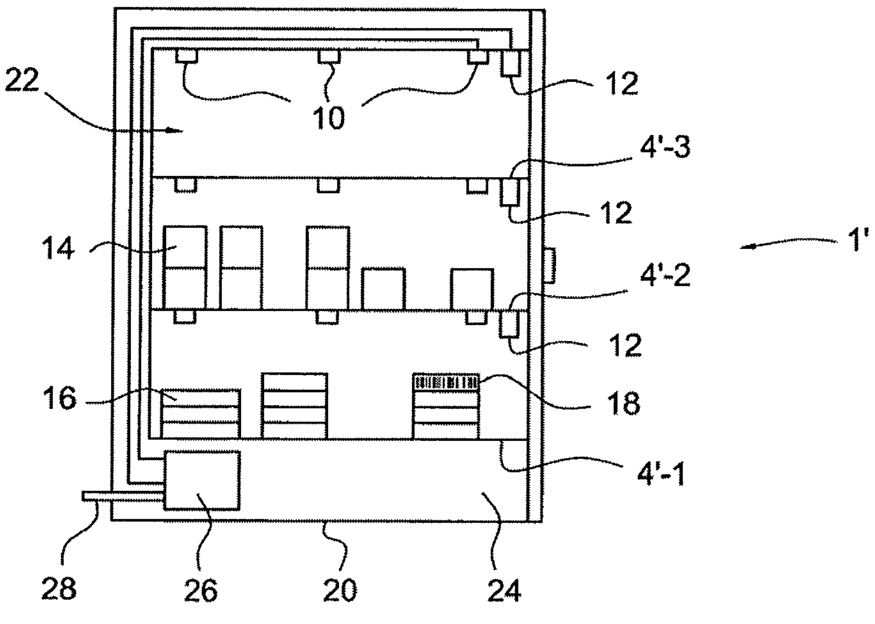
FIG. 2 shows a diagrammatic side view in cross section of another product display system according to the invention.

FIG. 2 shows a diagrammatic side view in cross section of another product display system according to the invention.

In this case, the product display system 1' comprises a refrigerator 20, a door 22 and a space 24, having a control device 26 and an external connection 28 therein.

In addition, three shelves 4'-1 to 4'-3, as well as light sources 10 and barcode readers 12, as well as products 14 and 16, provided with a barcode 18, are shown.

The refrigerator 20 is a closed display cabinet having a door 22 which is usually transparent. Customers choose a product 14, 16, open the door 22 and take the product from the refrigerator. In order to allow this process to run smoothly, the lighting has to be good, as otherwise, for example, many people would open the cabinet and only then start to assess the products. In addition, the principle of product promotion through sophisticated lighting applies in this case as well.

To this end, several light sources 10 are also provided in the depth direction, which are thus able to light the products at the back well. The light sources 10 are connected to a control device 26, which is situated, for example, in the space 24. Another location, even outside the cabinet, is of course also possible. The control device 26 is coupled or can be coupled to an external control device or data storage device (not shown) by means of the diagrammatically illustrated connection 28.

Also shown are information input devices, such as the barcode readers 12 which, for example, can read the barcode 18 on product 16. The information collected by reading the barcode identifies either directly a desired lighting or the product, the control device 26 connecting to a file containing stored lighting information, such that the control device can adjust the lighting desired for the product 16. Of course, it is also possible to work with a separate barcode reader, a connection being made, for example, to the position where the product will be displayed. Alternatively or additionally, other devices may be provided, such as identification chips or labels, or even a connection to the control device in the form of a keyboard or external computer or the like. The most important thing is that the control device can be influenced in order to set the lighting adjustment of the light sources 10 as desired.

Figure 3:
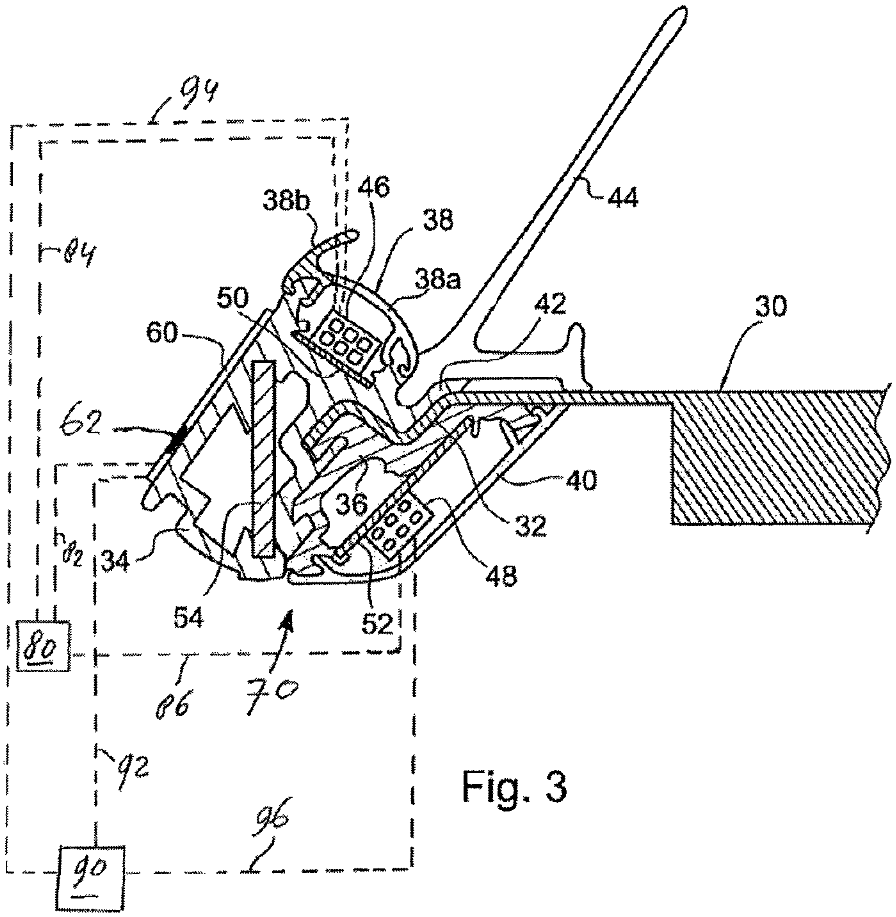
FIG. 3 shows a cross-section, partially in view, of a profile assembly with a lighting device and a display, the profile assembly connected to a shelf.

FIG. 3 shows a shelf 30 provided with a profiled edge part 32 (lip). A profile assembly 70 is connected to the profiled edge part 32. In the embodiment shown, the edge part 32 is contained by two profiles 34, 36 which in a suitable manner engage each other such that they can only be moved (slid) in a direction at right angles to the plane of drawing relative to each other an relative to the edge part 32. A hood 38 is mounted to the profile 34 by means of sliding of the hood 38 and the profile 34 relative to each other in a direction at right angles to the plane of drawing, or by means of a snap connection in a direction at right angles thereto. The hood comprises a transparent part 38*a* and a (co-extruded) non-transparent part 38*b*. An at least partially transparent hood 40 is mounted on the profile 36 by means of sliding of the hood 40 and the profile 36 relative to each other in a direction at right angles to the plane of drawing, or by means of a snap connection in a direction at right angles thereto. A wall part 44 is placed against a lip 42 of the profile 34, the wall part forming a boundary part for a shelf space. The wall part 44 is at least partially transparent.

In a channel formed by the profile 34 and the hood 38, as well as in another channel formed by the profile 36 and the hood 40, a lighting device 46, 48, respectively, is mounted on a carrier 50, 52, respectively, by means of sliding in a direction at right angles to the plane of drawing, or by means of a snap connection in a direction at right angles thereto. In a channel formed in the profile 34, a metal strip 54 may be provided to make the profile more rigid.

The lighting device 46 illuminates products (not shown in detail) places on the shelf 30 in that the light produced by the lighting device 46 passes the part 38*a* of the hood 38 and the edge part 44. In this arrangement, the part 38*b* of the hood 38 ensures that a person being near the shelf is not blinded by the light produced by the lighting device 46. The lighting device 48 illuminates products (not shown in detail) which have been placed in a space below the shelf 30 since the light produced by the lighting device 48 passes the hood 40.

The light generated by the respective lighting devices 46 and 48 may differ in terms of colour and intensity, and also in time, by controlling the lighting devices 46, 48 each separately. The control is made on the basis of information which has been read from a product information carrier coupled to a product, one or more corresponding light sources which are adapted to illuminate a place designed for a product, being adjusted in a predetermined way. Each of the lighting devices 46, 48 may comprise LEDs that each generate a different colour of light, and that each separately are adjustable and controllable for generating light with a predetermined variation in time and intensity.

A display device 60 (only diagrammatically shown) configured to display information relating to a product being behind it on a shelf may be mounted to the profile 34. This information may or may not be dynamical. If, for example, the display device 60 comprises a controllable display screen for displaying still or moving images, the display device 60 may be controlled such that it displays current information corresponding to the product, which corresponds to, or is synchronized with the illumination of the product. By way of example, the illumination of the product may be varied in the course of a day such that more attention is put to the product, while in parallel thereto the price of the product shown on the display device 60 changes, e.g. decreases. Thus, for a product on the shelf 30 an adjustment of the lighting may be coupled with an adjustment of the display, i.e. a display of a still or a moving image on the display.

The display screen of the display device 60 may comprise an LCD screen. In an embodiment, the display screen may comprise an e-paper screen, i.e. a bistable LCD screen which only requires power to change a displayed image, and requires no power when an image is displayed and does not change. Other screen technologies than LCD may be applied.

The display device 60 may have a power supply contained in the display device 60, such as a battery. Such power supply contained in the display device may also be referred to as an internal power supply. In some embodiments, as illustrated in FIG. 3, the display device 60 may have an external power supply 80 which may feed at least one display device 60. The external power supply 80 may be an AC or DC power supply. Power may be supplied to the display device 60 through one or more electrically conducting parts of the profile assembly 70, such as the profile 34 and/or 36, which part(s) are connectable to a power supply 80, e.g. by suitable connectors mounted on the profile assembly 70. For safety purposes, the profile 34 and/or 36 may be provided with an electrically isolating coating. The profile assembly 70 may also comprise electrical conductors accommodated in channels of, or formed by the profiles 34, 36 to connect the display device 60 to the external power supply 80. A connection between the power supply 80 and the display device(s) 60 is illustrated by dashed line 82.

The power supply 80 may also supply power to the lighting device(s) 46, 48, either through one or more electrically conducting parts of the profile assembly 70, such as the profile 34 and/or 36, or by electrical conductors accommodated in channels of, or formed by the profiles 34, 36 to connect the lighting device(s) 46, 48 to the power supply 80. A connection between the power supply 80 and the lighting device(s) 46, 48 is illustrated by dashed lines 84, 86. It is noted that a power supply for powering the display device 60 may be the same as a power supply for powering the lighting device(s) 46, 48, or may be different therefrom.

The display device(s) 60, and the lighting device(s) 46, 48 are configured to be coupled to a control device 90, as illustrated by dashed lines 92, 94, 96, respectively. The coupling may be through an electrically conducting path, such as through electrically conducting part(s) of the profile assembly 70, or through electrical conductors, such as electrical conductors accommodated in channels of, or formed by the profiles 34, 36 to connect the display device 60 and the lighting device(s) 46, 48 to the control device 90, or through a wireless transmission path, such as a radio frequency of infrared transmission path. The electrically conducting path or the wireless transmission path between the control device 90, on the one hand, and the display device(s) 60 and lighting device(s) 46, 48, on the other hand, provides for communication of control signals. The control device 90 may be provided for a combination of one display device 60 and corresponding lighting device(s) 46, 48 configured for a specific location of a product carrier 30, or for a plurality of display devices 60 and lighting devices 46, 48, and may be accommodated in or on the profile assembly 70, or connectable to the profile assembly 70, e.g. by appropriate connectors mounted on the profile assembly 70.

The control device 90 may obtain information relevant for adjusting the display device(s) 60 and/or for adjusting the lighting device(s) 46, 48 from a (product) information carrier, possibly through a connection such as 28 as shown in FIG. 1. In an embodiment, information for adjusting the display device 60 and/or the lighting device(s) 46, 48 is received through a communication device 62 contained in the display device. The communication device 62 may receive such information wirelessly. The communication device 62 may comprise a radio frequency or an infrared receiver or transceiver to receive said information, which may be transmitted for a central location to one or more profile assemblies 70. If the information concerns information to adjust the display screen of the display device, it may be processed in the display device 60, or transmitted to the control device 90 for controlling the display device 60. If the information concerns information to adjust the lighting device(s) 46, 48, it may be transmitted to the control device 90 to control the lighting device(s) 46, 48. The control device 90 may form part of the display device 60 and/or the lighting device(s) 46, 48. The display device 60 may be controlled in correspondence with, or in synchronism with the lighting device(s) 46, 48.

The terms “a” or “an”, as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps).

The mere fact that certain measures are recited in mutually different dependent claims does not indicate that a combination of these measures cannot be used to advantage.

The term coupled, as used herein, is defined as connected, although not necessarily directly, and not necessarily mechanically.

The above-described embodiments are only non-limiting examples. The scope of protection is determined by the attached claims.

The invention claimed is:

1. A product display system, comprising:

a product carrier;

a control device; and at least two light sources adapted to illuminate a product carried by the product carrier, each light source comprising at least two LEDs of different colour, which light sources are adjustable by the control device, wherein the control device is adapted to read an information carrier containing information relevant for lighting the product, and to adjust at least one of the light sources in a predetermined manner on the basis of information read from the information carrier.

2. The product display system of claim 1, wherein each light source is provided with its own control device.

3. The product display system of claim 1, wherein a single control device is connected to and adapted for controlling several light sources.

4. The product display system of claim 3, wherein the control device is adapted to control the light sources of a shelf, of a cabinet, of a row of cabinets, or of a complete shop.

5. The product display system of claim 1, wherein several control devices communicate with a central control system.

6. The product display system of claim 1, wherein at least one of the colour and the luminosity of at least one light source is adjustable.

7. The product display system of claim 1, wherein the control device comprises an information input device adapted for inputting and processing product-related information with regard to an adjustment of at least one light source.

8. The product display system of claim 7, wherein the information input device is selected from a group of input devices comprising a barcode reader, an infrared reader, a chip reader and a keyboard.

9. The product display system of claim 1, wherein at least one light source is displaceable with respect to the product carrier.

10. The product display system of claim 1, wherein the light sources are arranged on a product carrier at a regular distance apart.

11. The product display system of claim 1, wherein at least one light source comprises two part-light sources, one of which is adapted to shine light downwards and one of which is adapted to shine light upwards.

12. The product display system of claim 1, wherein the product carrier comprises a display cabinet having a plurality of shelves positioned one above the other.

13. The product display system of claim 12, wherein the display cabinet comprises a closed cabinet.

14. The product display system of claim 12, comprising several display cabinets arranged in at least one row.

15. The product display system of claim 1, wherein the information carrier is provided with an element selected from a group of elements comprising a barcode comprising lighting information, an infrared diode comprising lighting information and a chip comprising lighting information.

16. The product display system of claim 1, wherein at least one of the group comprising the product, the product carrier and the control device is provided with the information carrier.

17. The product display system of claim 1, wherein the control device is connectable to an information storage unit containing lighting information related to a product.

18. The product display system of claim 1, further comprising a display device adjustable by the control device, the display device being adapted to display, in correspondence with the adjustment of the light source, product information on the basis of information read from the information carrier.

19. The product display system of claim 18, further comprising a profile assembly for mounting the light source and the display device.

20. The product display system of claim 1, further comprising a profile assembly, the profile assembly comprising:

a light source adapted to illuminate a product carried by a product carrier, and an adjustable display device comprising a controllable display screen for displaying still or moving images related to the product.

21. The product display system of claim 20, wherein the display screen is an LCD screen.

22. The product display system of claim 20, wherein the display screen is an e-paper screen.

23. The product display system of claim 1, wherein the light source and the display device are configured to be coupled to the control device.

24. The product display system of claim 23, wherein the control device is adapted to adjust the light source in a predetermined manner on the basis of lighting information.

25. The product display system of claim 23, wherein the control device is adapted to adjust the display device in a predetermined manner on the basis of display information.

26. The product display system of claim 24, wherein the display device comprises a communication device configured to receive display information and lighting information, and wherein the communication device is configured to be coupled to the control device for transmitting the lighting information to the control device.

27. The product display system of claim 23, wherein the control device is adapted to adjust the display device and the light source in correspondence with each other.

28. The product display system of claim 20, the profile assembly comprising a channel for accommodating the light source, the channel formed by a profile and a hood.

29. The product display system of claim 28, wherein the hood is at least partially transparent.

30. The product display system of claim 20, wherein the profile assembly is configured to be connected to a profiled edge part of the product carrier.

31. The product display system of claim 20, wherein the profile assembly is configured to be coupled to a power supply, and wherein the light source and the display device are powered from the power supply.

32. A method for illuminating a product, the method comprising:

providing a product carrier;

providing at least two controllably adjustable light sources adapted to illuminate the product carried by the product carrier, each light source comprising at least two LEDs of different colour;

providing an information carrier containing information relevant for lighting the product;

reading the information carrier; and adjusting at least one of the light sources in a predetermined manner on the basis of information read from the information carrier.

33. The method of claim 32, further comprising:

adjusting light sources of a shelf, of a cabinet, of a row of cabinets, or of a complete shop in a predetermined manner on the basis of information read from the information carrier.

34. The method of claim 32, further comprising:

centrally controlling the adjusting of light sources in a predetermined manner on the basis of information read from the information carrier.

* * * * *